March 4, 1924. 1,486,001

T. C. ALLISON

SAW SET

Filed Dec. 15, 1922 2 Sheets-Sheet 1

T. C. Allison,
Inventor

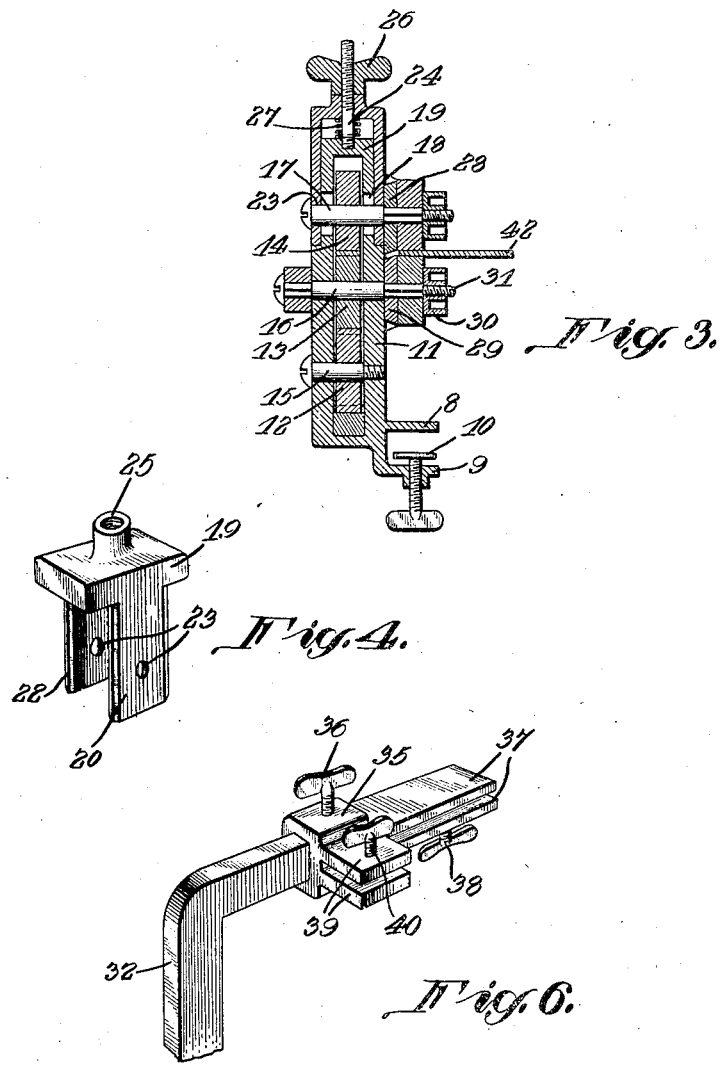

Patented Mar. 4, 1924.

1,486,001

UNITED STATES PATENT OFFICE.

THOMAS COOPER ALLISON, OF HOHENWALD, TENNESSEE.

SAW SET.

Application filed December 15, 1922. Serial No. 607,131.

*To all whom it may concern:*

Be it known that I, THOMAS COOPER ALLISON, a citizen of the United States, residing at Hohenwald, in the county of Lewis and State of Tennessee, have invented a new and useful Saw Set, of which the following is a specification.

This invention relates to saw sets, the primary object of the invention being to improve generally the construction as set forth in my application filed April 26, 1922, and bears Serial Number 556,611.

An object of the invention is to provide means for exerting an even pressure on the setting dies of the device, to insure against breaking of the teeth from the saw blade during the setting operation.

A still further object of the invention is to provide means for supporting a band saw in proper setting relation with the dies of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 is a sectional view taken on line 3—3 of Figure 1.

Figure 4 is a perspective view of the upper die support.

Figure 5 is a sectional view taken on line 5—5 of Figure 1.

Figure 6 is a perspective view of one of the saw clamps.

Figure 1:
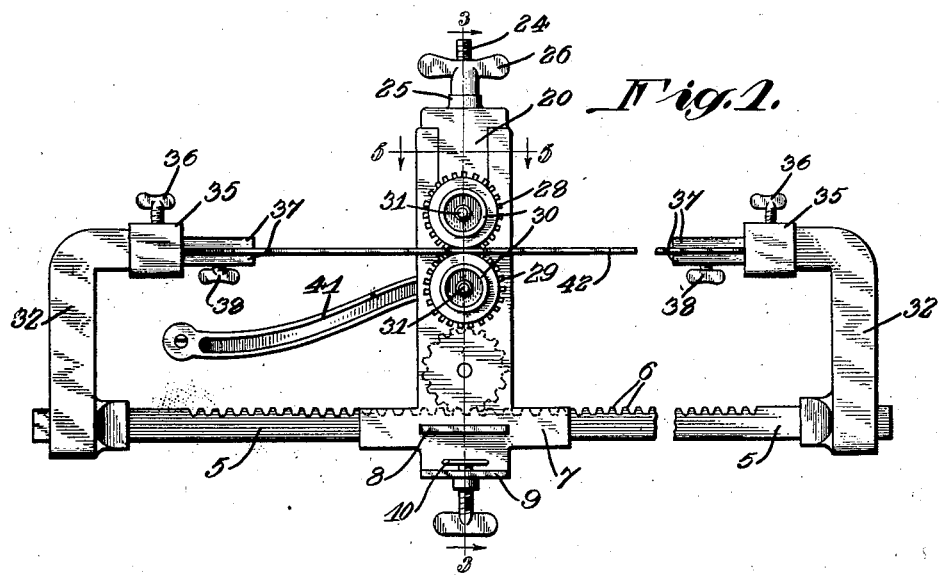
Figure 1 is a front elevational view of a saw setting device constructed in accordance with the invention.
Figure 2:
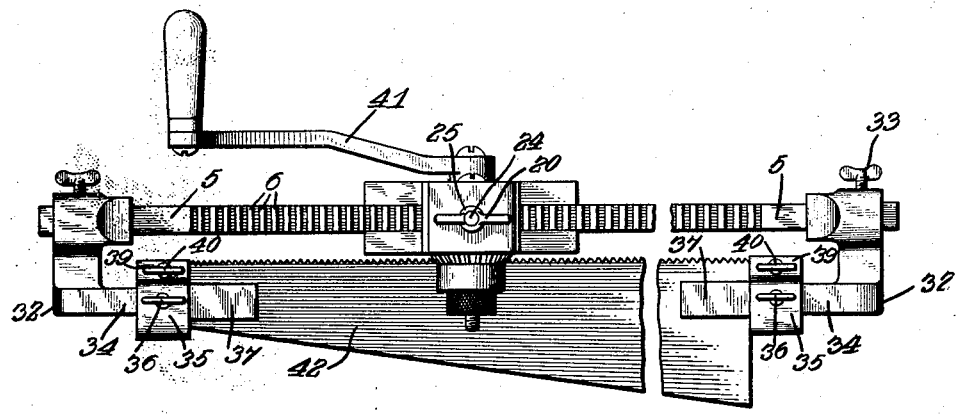
Figure 2 is a plan view thereof.

Referring to the drawings in detail, the reference character 5 designates the main or supporting bar which is square in cross section and provided with teeth 6 formed in the upper edge thereof.

The body portion of the device includes a U-shaped base 7 constructed to receive the bar 5 which is designed to move therethrough, the base 7 being however provided with a stationary jaw 8 and a flange 9 through which the shank of jaw 10 moves to cooperate with the jaw 8 to clamp a support and secure the device against movement.

As shown, the body portion embodies opposed walls 11, between which the gears 12, 13 and 14 operate, the gear 12 being mounted on the shaft 15, while the gear 13 is mounted on the shaft 16 and the gear 14 mounted on the shaft 17.

This shaft 17 is movable vertically with respect to the shafts 15 and 16, the shaft 17 being mounted in the enlarged openings 18 formed in the side walls of the body portion, to permit of such movement. The upper portion of the body is reduced as at 19 to accommodate the arms 20 of the bearing member or upper shaft support, grooves 21 being formed in the side walls of the body portion to accommodate the inclined edges 22 or the arms 20 to insure a true vertical movement of the upper bearing member.

Openings 23 are provided in the bearing member and accommodate the shaft 17 so that movement of the bearing member will result in a relative movement of the shaft and setting dies supported thereby. Secured to the upper end of the body portion is a threaded bolt 24 that extends through the opening 25 in the upper end of the bearing member, there being provided a winged nut 26 operating on the bolt to normally hold the bearing member in various positions of adjustment, it being understood that due to the vertical movement of the bearing member, the setting dies to be hereinafter more fully described, may be adjusted with respect to each other.

A coiled spring 27 is disposed between the bearing member and the upper end of the body portion as clearly shown by Figure 3 of the drawings, which coiled spring is designed to exert a pressure on the bearing member to force the same into close engagement with the winged nut 26.

The shafts 16 and 17 are shown as extending beyond one of the side walls of the body portion of the device which extensions are squared to receive the setting dies 28 and 29, the setting dies having teeth, the teeth of one die passing between the adjacent teeth of the opposed die to bend the saw teeth contacting therewith.

The dies are held in position by means of the nuts 30 that are shown as positioned on the threaded extremities 31 of the shafts 16 and 17, it being understood that due to this construction, the dies may be readily and easily removed and replaced when it becomes necessary to repair the same.

Adjustably mounted on the bar 5 and disposed adjacent to the ends thereof, are the arms 32 that have openings at the lower ends thereof to accommodate the bar 5 and permit the arms to be adjusted longitudinally of the bar 5, screws 33 being provided to secure the arms in their positions of adjustment.

At the upper ends of the arms 32 are inwardly extended portions 34 on which the saw clamps 35 are adjustably positioned, the saw clamps being formed with openings to accommodate the inwardly extended portions 34 and provided with set screws 36, to secure the saw clamps in their positions of adjustment.

Each of these saw clamps comprises pairs of spaced arms 37 between which the ordinary carpenter's saw may be positioned and secured by means of the winged screw 38.

From the foregoing it will be seen that due to the construction of these saw clamps, a saw may be supported at its ends in such a way as to hold the same against vibration or movement when the saw is being moved through the setting dies.

In order that the device may be efficiently employed for setting the teeth of band saws, laterally extending arms 39 are provided, which arms are arranged in pairs and so disposed that the band saw may be slid therebetween, and held against movement by means of the winged screw 40.

Secured to the shaft 16 at one end thereof, is an operating handle 41 which may be grasped by the operator and rotated, imparting a relative rotary movement to the gears supported within the body. It is obvious that as the gears are rotated, the body portion being secured to a support, causes the bar 5 and saw, which in the present instance is indicated by the reference character 42 to move longitudinally of the base 7, moving the saw blade through the setting dies to accomplish the setting result.

What is claimed is:—

1. In a saw set, a body portion, gearing supported by the body portion, a pair of cooperating setting dies disposed laterally of the body portion, a bar movable through the body having teeth in mesh with one of the gears to cause the bar to move through the body portion when the gears are rotated, saw supporting means on the bars, means for permitting movement of one die with respect to the other die, and said saw supporting means adapted to support a saw to cause the teeth thereof to move between the setting dies.

2. In a saw set, a body portion, an upper shaft, a lower shaft and an intermediate shaft supported by the body portion, gears supported by the shafts, setting dies supported by the upper shaft and intermediate shaft, said body portion having elongated openings in which the upper shaft moves, a vertically movable bearing member having openings to receive the upper shaft, means for adjusting the upper shaft to adjust the setting dies, a bar having teeth movable through the body portion, and meshing with the gear of the lower shaft, said bar having means for supporting a saw, and means for rotating the setting dies and moving the bar through the body portion.

3. In a saw setting device, a body portion, said body portion having grooves formed in the side walls thereof, a bearing member movable in the grooves and having openings, said body portion having elongated openings cooperating with the openings of the bearing member, an upper shaft positioned in the elongated openings, an intermediate shaft and a lower shaft, gearing supported by the shafts, setting dies on the upper and intermediate shafts, means for adjusting the upper shaft with respect to the intermediate shaft, and means for supporting a saw to cause the teeth thereof to move between the setting dies.

In testimony that I claim the foregoing as my own, I have hereto affixed my signature in the presence of two witnesses.

THOMAS COOPER ALLISON.

Witnesses:
F. A. GOODMAN,
A. M. RASBERRY.